Patented July 12, 1949

2,475,629

UNITED STATES PATENT OFFICE 2,475,629

METHOD OF PEST CONTROL

Edmund R. Meincke, Stamford, Conn., assignor to American Cyanamid Company, New York, N. Y., a corporation of Maine No Drawing. Application May 2, 1941, Serial No. 391,485

7 Claims. (Cl. 167—22)

The present invention relates to pest-control compositions and more particularly to a series of compounds of exceptional activity for the control of harmful lower forms of life, such as insects, bacteria, fungi, etc., which prey on living and non-living organic matter.

I have found that the alkyl esters of unsaturated tricarboxylic acids provide a particularly new and effective means for controlling soft-bodied and sucking insects, for example, the citrus red spider, *Paratetranychus citri*, and the black bean aphid, *Aphis rumicis*. In particular, they function excellently as contact poisons without any substantial harmful or detrimental action on the plants infested with the insects.

These esters comprise both the acid and neutral esters, the ones giving the outstanding results being the neutral esters of aconitic acid, e. g. triethyl aconitate, tri-n-propyl aconitate, tri-n-butyl aconitate, tri(act. amyl) aconitate, tri(sec. hexyl) aconitate, tri(2-ethylhexyl) aconitate, trilauryl aconitate, tri-n-tetradecyl aconitate, tristearyl aconitate, etc.

The following examples illustrate a general method of preparing the above compounds in accordance with the invention. Materials employed are in parts by weight.

EXAMPLE 1

A mixture consisting of 52 parts of aconitic acid, 90 parts of n-propyl alcohol, 45 parts of benzene and 0.25 part of p-toluene sulfonic acid (catalyst) was stirred and heated for 12 hours in a vessel fitted with a thermometer, stirrer and reflux condenser. As the esterification proceeded the water resulting from the reaction refluxed with the benzene as an azeotrope and was removed by means of a side-trap at the base of the condenser. During this period, 16 parts of water were removed and the temperature of the reaction mixture rose from 90° C. to 120° C. Upon cooling to room temperature, the mixture was washed with 200 parts of 5% sodium carbonate solution and then with water. After distilling off the benzene and excess propyl alcohol, the product was fractionated in vacuo. The tri-n-propyl aconitate was obtained as a colorless, odorless liquid boiling at 157°–162° C. at 2 mm.

Specific gravity at 25° C _____ 1.050
Refractive index ($N_D^{25°}$) _____ 1.4521
Saponification equivalent _____ 99.2

EXAMPLE 2

A mixture consisting of 69.5 parts of aconitic acid, 166 parts of active amyl alcohol and 1.7 parts of p-toluene sulfonic acid was treated according to the procedure of Example 1. During the esterification the water resulting from the reaction refluxed with the excess amyl alcohol as an azeotrope. 139 parts (91% of theory) of tri(act. amyl) aconitate, a colorless, odorless liquid were obtained boiling at 193°–197° C. at 3 mm.

Specific gravity at 25° C _____ 0.991
Refractive index ($N_D^{25°}$) _____ 1.4540

EXAMPLE 3

A mixture consisting of 104 parts of aconitic acid, 355 parts of 2-ethylhexyl alcohol, 110 parts of toluene and 3.5 parts of p-toluene sulfonic acid was heated for 2 hours in the esterification vessel described in Example 1. During this period the temperature of the reaction mixture rose from 120° to 150° C. The cooled mixture was washed with 100 parts of 5% sodium carbonate solution and then with water. The toluene and excess alcohol were steam-distilled from the ester, and the latter dried by heating to 150° C. The product, tri(2-ethylhexyl) aconitate, was a light yellow oil obtained in a yield of 292 parts (95.5% of theory).

Specific gravity _____ 0.957
Refractive index ($N_D^{25°}$) _____ 1.4600
Saponification equivalent _____ 174

EXAMPLE 4

A mixture consisting of 34.8 parts of aconitic acid, 111 parts of lauryl alcohol, 45 parts of toluene, and 0.5 part of p-toluene sulfonic acid was treated in the esterification vessel according to the procedure for Example 1. The reaction mixture was cooled to room temperature (20° C.) and the toluene removed by distillation. The ester was purified by dissolving it in 500 parts of methyl alcohol at 25° C., cooling to —20° C. in a solid carbon dioxide-acetone bath and filtering. The trilauryl aconitate was obtained as a yellow solid (M. P. 10° C.) which melted to a yellow oil on standing at room temperature.

Refractive index ($N_D^{25°}$) _____ 1.4578
Saponification equivalent _____ 226

EXAMPLE 5

A mixture consisting of 34.8 parts of aconitic acid, 162 parts of stearyl alcohol, 45 parts of toluene, and 0.2 part of p-toluene sulfonic acid was heated for 8 hours in the esterification vessel described in Example 1. During this period the temperature of the reaction mixture rose from 100° C. to 136° C. After removal of the toluene by distillation, the product was dissolved in 400 parts of warm acetone (45° C.). Upon cooling the solution to 5° C., the tristearyl aconitate crystallized and was filtered therefrom. The ester was a light yellow solid, melting at 55.5° C.

Saponification equivalent _____ 312

Spray solutions were prepared by dissolving the compounds in a solvent medium consisting of 65% acetone and 35% water. The following table shows typical kills obtained under comparable conditions for the various dilutions when the sprays were used against red spiders and aphids.

Table

| Insect | Compound | Dilution | Per cent Kill |
|---|---|---|---|
| Citrus red spider | Triethyl aconitate | 1–500 | 96 |
| Do | Tri-n-butyl aconitate | 1–5,000 | 100 |
| Do | do | 1–10,000 | 93.7 |
| Do | Tri (act. amyl) aconitate | 1–1,000 | 100 |
| Do | do | 1–2,000 | 90.7 |
| Do | Tri (sec. hexyl) aconitate | 1–500 | 100 |
| Do | do | 1–1,000 | 94.8 |
| Do | Tri (2-ethylhexyl) aconitate | 1–500 | 98.7 |
| Do | Trilauryl aconitate | 1–500 | 100 |
| Do | do | 1–1,000 | 62 |
| Black bean aphid | Tri-a-butyl aconitate | 1–500 | 98.8 |
| Do | Tri (act. amyl) aconitate | 1–500 | 97.3 |
| Do | Tri (2-ethylhexyl) aconitate | 1–500 | 75.2 |

While the compounds of this invention are especially effective as contact insecticides, they may be of assistance also in preventing bacterial and fungal putrefaction of proteins, such as gelatin, glue, starch pastes, leather, cellulosic materials, casein products, and other natural or manufactured products that are subject to attack or decomposition by various bacteria and molds. They may be used also for the control of fungous diseases on seeds and living plants.

In their application, it may be preferable or desirable to combine these materials with supplementary agents such as absorbent bodies, dispersing agents, sticking agents, and the like. They may be applied as solutions in organic solvents, in aqueous dispersions, or in dusts with such inert solid diluents as walnut shell, wood flour, talc, and the like.

Although the alkyl esters of aconitic acid have been found particularly outstanding in their effectiveness, the alkyl esters of other unsaturated tricarboxylic acids such as for example those of α-methyl aconitic acid, αγ-dimethyl aconitic acid, isoaconitic acid and the like may also be utilized.

The term "pest-control composition," as used herein and in the appended claims, shall be construed as a preparation useful for insecticidal, fungicidal, bactericidal and analogous purposes.

While the invention has been described with particular reference to specific embodiments, it is to be understood that it is not to be limited thereto but is to be construed broadly and restricted solely by the scope of the appended claims.

I claim:

1. The method of protecting plants from insects which comprises applying to the plants while infested with such insects a composition containing as an essential active ingredient an alkyl ester of aconitic acid.

2. A method of protecting materials from insects, fungi and bacteria which comprises applying to said materials a pest control composition containing as an essential active ingredient an alkyl ester of a member of the group consisting of aconitic acid, its homologues and its isomers.

3. A method of protecting materials from insects, fungi and bacteria which comprises applying to said materials a pest control composition containing as an essential active ingredient an alkyl ester of an aconitic acid.

4. A method of protecting materials from insects, fungi and bacteria which comprises applying to said materials a pest control composition containing as an essential active ingredient a trialkyl ester of aconitic acid.

5. A method of protecting materials from insects, fungi and bacteria which comprises applying to said materials a pest control composition containing as an essential active ingredient a tri-n-butyl aconitate.

6. A method of protecting materials from insects, fungi and bacteria which comprises applying to said materials a pest control composition containing as an essential active ingredient a tri(act. amyl) aconitate.

7. A method of protecting materials from insects, fungi and bacteria which comprises applying to said materials a pest control composition containing as an essential active ingredient a tri(sec. hexyl) aconitate.

EDMUND R. MEINCKE.

REFERENCES CITED

The following references are of record in the file of this patent:

UNITED STATES PATENTS

| Number | Name | Date |
|---|---|---|
| 1,993,552 | Izard | Mar. 5, 1935 |

OTHER REFERENCES

Desai, Chemical Abstracts, vol. 26, (1932), page 3848.